United States Patent
Katoh et al.

(10) Patent No.: US 9,720,959 B2
(45) Date of Patent: *Aug. 1, 2017

(54) DATA OUTPUT METHOD, COMPUTER-READABLE RECORDING MEDIUM STORING DATA OUTPUT PROGRAM AND DATA OUTPUT SYSTEM

(71) Applicant: FUJITSU LIMITED, Kawasaki-shi, Kanagawa (JP)

(72) Inventors: Takashi Katoh, Yokohama (JP); Shinichiro Tago, Shinagawa (JP); Tatsuya Asai, Kawasaki (JP); Hiroaki Morikawa, Kawasaki (JP); Junichi Shigezumi, Kawasaki (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 365 days.

This patent is subject to a terminal disclaimer.

(21) Appl. No.: 14/283,295

(22) Filed: May 21, 2014

(65) Prior Publication Data

US 2015/0026555 A1    Jan. 22, 2015

(30) Foreign Application Priority Data

Jul. 16, 2013    (JP) ................................. 2013-147959

(51) Int. Cl.
*G06F 7/00* (2006.01)
*G06F 17/30* (2006.01)

(52) U.S. Cl.
CPC .............................. *G06F 17/30424* (2013.01)

(58) Field of Classification Search
CPC .......................... G06F 17/30958; G06T 11/206
(Continued)

(56) References Cited

U.S. PATENT DOCUMENTS 5,201,046 A * 4/1993 Goldberg .......... G06F 17/30595
6,092,064 A * 7/2000 Aggarwal ......... G06F 17/30327
707/694

(Continued)

FOREIGN PATENT DOCUMENTS

JP    2001-167087    6/2001
JP    2003-345821    12/2003

(Continued)

OTHER PUBLICATIONS

Final Office Action mailed Dec. 30, 2016 in co-pending U.S. Appl. No. 14/308,738.

(Continued)

*Primary Examiner* — Binh V Ho
(74) *Attorney, Agent, or Firm* — Staas & Halsey LLP

(57) ABSTRACT

A data output method, includes: extracting, by a computer, data satisfying a first condition on one data among a plurality of conditions, from a plurality of data, as a node; creating a first graph by coupling two nodes satisfying a second condition on a relationship between two data among the plurality of conditions with a link; creating a second graph by deleting a node that does not satisfy the second condition from the first graph; determining candidates of data combination in the second graph; and outputting a data combination satisfying the plurality of conditions from the candidates of data combination.

9 Claims, 15 Drawing Sheets

(58) Field of Classification Search
USPC .......................................................... 707/797
See application file for complete search history.

(56) References Cited

U.S. PATENT DOCUMENTS

| | | | |
|---|---|---|---|
| 2001/0007987 A1 | 7/2001 | Igata | |
| 2001/0042059 A1* | 11/2001 | Uehara | G06F 17/30595 |
| 2002/0004710 A1* | 1/2002 | Murao | G06T 17/005 |
| | | | 702/167 |
| 2008/0235193 A1* | 9/2008 | Hattori | G06F 17/30935 |
| 2009/0259652 A1* | 10/2009 | Yamane | G06F 17/30598 |
| 2010/0082762 A1* | 4/2010 | Hotta | G06Q 30/06 |
| | | | 709/207 |
| 2011/0004631 A1 | 1/2011 | Inokuchi et al. | |
| 2011/0307511 A1* | 12/2011 | Asai | G06F 17/30926 |
| | | | 707/769 |
| 2012/0150873 A1* | 6/2012 | Tokai | G06F 17/30941 |
| | | | 707/749 |
| 2012/0293542 A1* | 11/2012 | Iwama | G06T 11/206 |
| | | | 345/619 |
| 2014/0324503 A1* | 10/2014 | Whittaker | G06Q 10/1095 |
| | | | 705/7.19 |
| 2015/0186457 A1* | 7/2015 | Enomoto | G06F 17/30424 |
| | | | 707/769 |

FOREIGN PATENT DOCUMENTS

| | | |
|---|---|---|
| JP | 2009-176072 | 8/2009 |
| JP | 2009-205269 | 9/2009 |
| JP | 2009-208904 | 9/2009 |
| JP | 2010-152748 | 7/2010 |
| JP | 2011-128748 | 6/2011 |
| JP | 2012-58835 | 3/2012 |

OTHER PUBLICATIONS

Office Action dated Jun. 16, 2016 in related U.S. Appl. No. 14/308,738.

U.S. Appl. No. 14/308,738, filed Jun. 19, 2014, Takashi Katoh et al., Fujitsu Limited.

\* cited by examiner

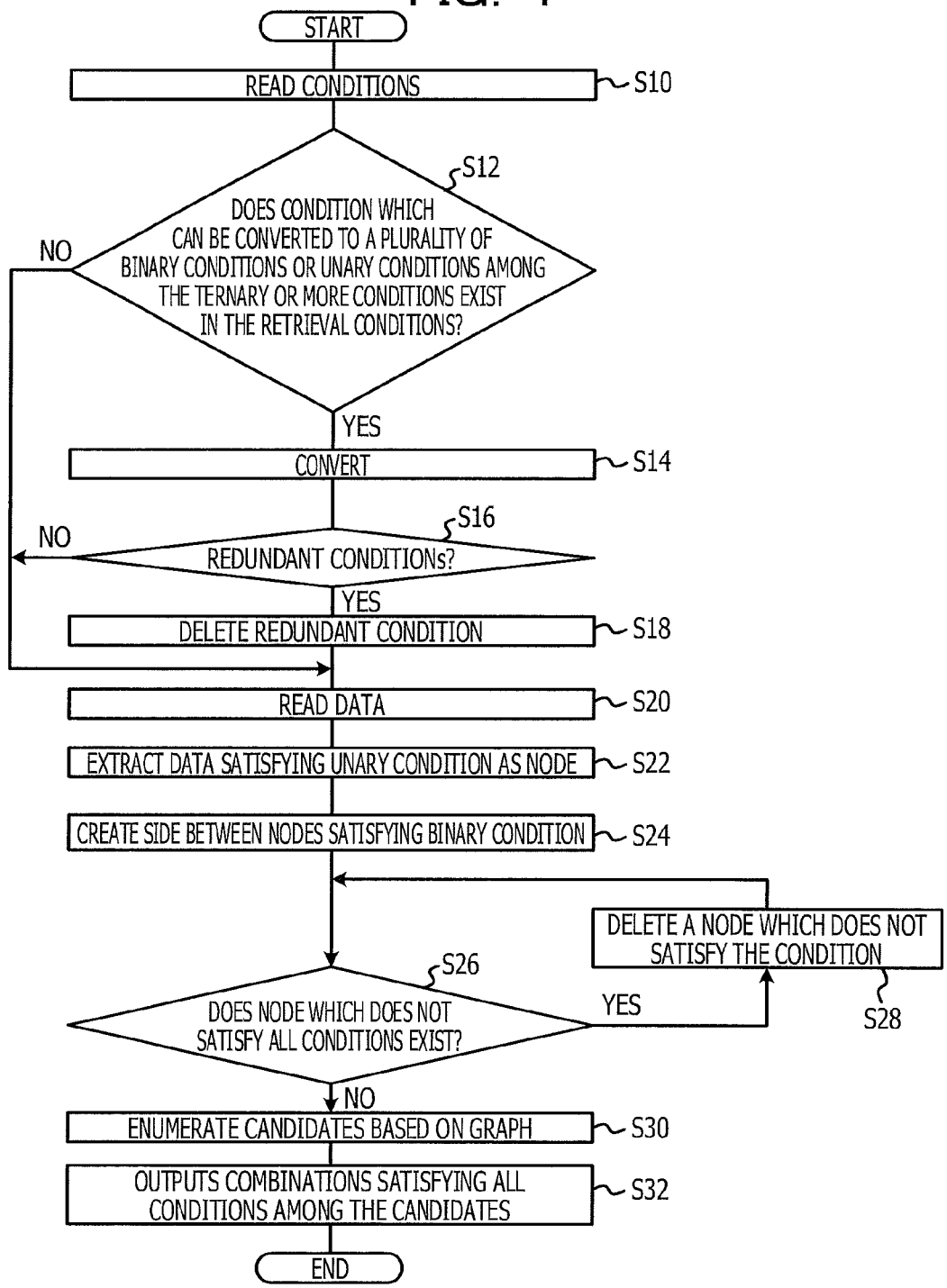

FIG. 5A

```
<RETRIEVAL CONDITIONS>
(1) TYPE OF X IS CPU
(2) TYPE OF Y IS MEM
(3) TYPE OF Z IS HDD
(4) VENDOR OF Y IS OTHER THAN STORE C
(5) DIFFERENCE IN PRICE BETWEEN X AND Z IS 10,000
    YEN OR LESS
(6) VENDORS OF X, Y AND Z ARE THE SAME
(7) TOTAL SUM OF PRICE OF X, Y AND Z IS 80,000 YEN
```

FIG. 5B

```
<RETRIEVAL CONDITIONS>
(1) TYPE OF X IS CPU
(2) TYPE OF Y IS MEM                                  ⎫
(3) TYPE OF Z IS HDD                                  ⎬ UNARY CONDITION
(4) VENDOR OF Y IS OTHER THAN STORE C                 ⎭
(5) DIFFERENCE IN PRICE BETWEEN X AND Z IS 10,000     ⎫ BINARY CONDITION
    YEN OR LESS                                       ⎭
(6) VENDORS OF X, Y AND Z ARE THE SAME                ⎫ TERNARY CONDITION
(7) TOTAL SUM OF PRICE OF X, Y AND Z IS 80,000 YEN    ⎭
```

FIG. 6A

```
<RETRIEVAL CONDITIONS>
(1) TYPE OF X IS CPU
(2) TYPE OF Y IS MEM                          } UNARY CONDITION
(3) TYPE OF Z IS HDD
(4) VENDOR OF Y IS OTHER THAN STORE C
(5) DIFFERENCE IN PRICE BETWEEN X AND Z IS 10,000
    YEN OR LESS                               } BINARY CONDITION
(6) VENDORS OF X, Y AND Z ARE THE SAME
      ·VENDORS OF X AND Y ARE THE SAME
      ·VENDORS OF Y AND Z ARE THE SAME
      ·VENDORS OF Z AND X ARE THE SAME        } TERNARY CONDITION
(7) TOTAL SUM OF PRICE OF X, Y AND Z IS 80,000 YEN
```

FIG. 6B

```
<RETRIEVAL CONDITIONS>
(1) TYPE OF X IS CPU
(2) TYPE OF Y IS MEM                          } UNARY CONDITION
(3) TYPE OF Z IS HDD
(4) VENDOR OF Y IS OTHER THAN STORE C
(5) DIFFERENCE IN PRICE BETWEEN X AND Z IS 10,000
    YEN OR LESS                               } BINARY CONDITION
(6) VENDORS OF X, Y AND Z ARE THE SAME
      ·VENDORS OF X AND Y ARE THE SAME
      ·VENDORS OF Y AND Z ARE THE SAME
      ·~~VENDORS OF Z AND X ARE THE SAME~~    } TERNARY CONDITION
(7) TOTAL SUM OF PRICE OF X, Y AND Z IS 80,000 YEN
```

DELETE REDUNDANT CONDITION

FIG. 7

| ID | TYPE | VENDOR | PRICE |
|---|---|---|---|
| 1 | HDD | STORE C | 50,000 YEN |
| 2 | CPU | STORE A | 40,000 YEN |
| 3 | MEM | STORE B | 10,000 YEN |
| 4 | MEM | STORE C | 20,000 YEN |
| 5 | MEM | STORE A | 20,000 YEN |
| 6 | CPU | STORE B | 40,000 YEN |
| 7 | HDD | STORE A | 30,000 YEN |
| 8 | MEM | STORE B | 30,000 YEN |
| 9 | HDD | STORE B | 10,000 YEN |
| 10 | CPU | STORE C | 20,000 YEN |
| 11 | HDD | STORE A | 20,000 YEN |
| 12 | CPU | STORE A | 30,000 YEN |

```
<RETRIEVAL CONDITIONS>
(1) TYPE OF X IS CPU
(2) TYPE OF Y IS MEM
(3) TYPE OF Z IS HDD
(4) VENDOR OF Y IS OTHER THAN STORE C
(5) DIFFERENCE IN PRICE BETWEEN X AND Z IS
    10,000 YEN OR LESS
(6-1) VENDORS OF X AND Y ARE THE SAME
(6-2) VENDORS OF Y AND Z ARE THE SAME
(7) TOTAL SUM OF PRICE OF X, Y AND Z IS 80,000 YEN
```

- (1)–(4) UNARY CONDITION
- (5), (6-1), (6-2) BINARY CONDITION
- (7) TERNARY CONDITION

FIG. 9A

<RETRIEVAL CONDITIONS>
(1) TYPE OF X IS CPU
(2) TYPE OF Y IS MEM
(3) TYPE OF Z IS HDD
(4) VENDOR OF Y IS OTHER THAN STORE C  } UNARY CONDITION
(5) DIFFERENCE IN PRICE BETWEEN X AND Z IS 10,000 YEN OR LESS
(6-1) VENDORS OF X AND Y ARE THE SAME
(6-2) VENDORS OF Y AND Z ARE THE SAME  } BINARY CONDITION
(7) TOTAL SUM OF PRICE OF X, Y AND Z IS 80,000 YEN  } TERNARY CONDITION

FIG. 9B

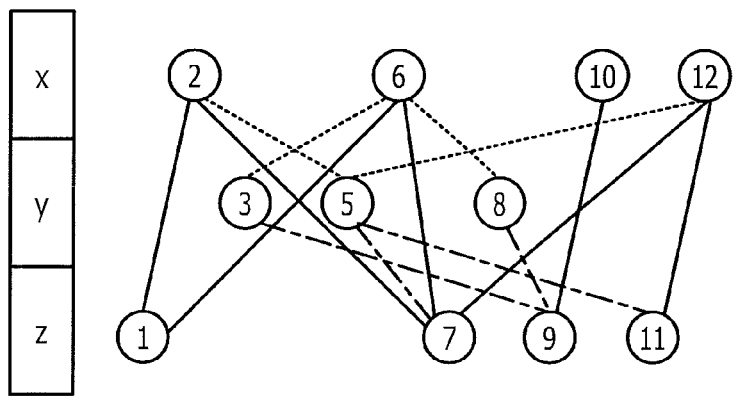

(5) DIFFERENCE IN PRICE BETWEEN X AND Z IS 10,000 YEN OR LESS  ———
(6-1) VENDORS OF X AND Y ARE THE SAME  ............
(6-2) VENDORS OF Y AND Z ARE THE SAME  — — —

FIG. 10

0x1
ELEMENT ID : x
DATA ID : 2
LIST SOLID LINE : 0x8 0x9
LIST DASHED LINE : 0x6
LIST LONG AND SHORT DASH LINE :

0x2
ELEMENT ID : x
DATA ID : 6
LIST SOLID LINE : 0x8 0x9
LIST DASHED LINE : 0x5 0x7
LIST LONG AND SHORT DASH LINE :

0x3
ELEMENT ID : x
DATA ID : 10
LIST SOLID LINE : 0x10
LIST DASHED LINE :
LIST LONG AND SHORT DASH LINE :

0x4
ELEMENT ID : x
DATA ID : 12
LIST SOLID LINE : 0x9 0x11
LIST DASHED LINE : 0x6
LIST LONG AND SHORT DASH LINE :

0x5
ELEMENT ID : y
DATA ID : 3
LIST SOLID LINE :
LIST DASHED LINE : 0x2
LIST LONG AND SHORT DASH LINE : 0x10

0x6
ELEMENT ID : y
DATA ID : 5
LIST SOLID LINE :
LIST DASHED LINE : 0x1 0x4
LIST LONG AND SHORT DASH LINE : 0x9 0x11

0x7
ELEMENT ID : y
DATA ID : 8
LIST SOLID LINE :
LIST DASHED LINE : 0x2
LIST LONG AND SHORT DASH LINE : 0x10

0x8
ELEMENT ID : z
DATA ID : 1
LIST SOLID LINE : 0x1 0x2
LIST DASHED LINE :
LIST LONG AND SHORT DASH LINE :

0x9
ELEMENT ID : z
DATA ID : 7
LIST SOLID LINE : 0x1 0x2 0x4
LIST DASHED LINE :
LIST LONG AND SHORT DASH LINE : 0x6

0x10
ELEMENT ID : z
DATA ID : 9
LIST SOLID LINE : 0x3
LIST DASHED LINE :
LIST LONG AND SHORT DASH LINE : 0x5 0x7

0x11
ELEMENT ID : z
DATA ID : 11
LIST SOLID LINE : 0x4
LIST DASHED LINE :
LIST LONG AND SHORT DASH LINE : 0x6

FIG. 14A
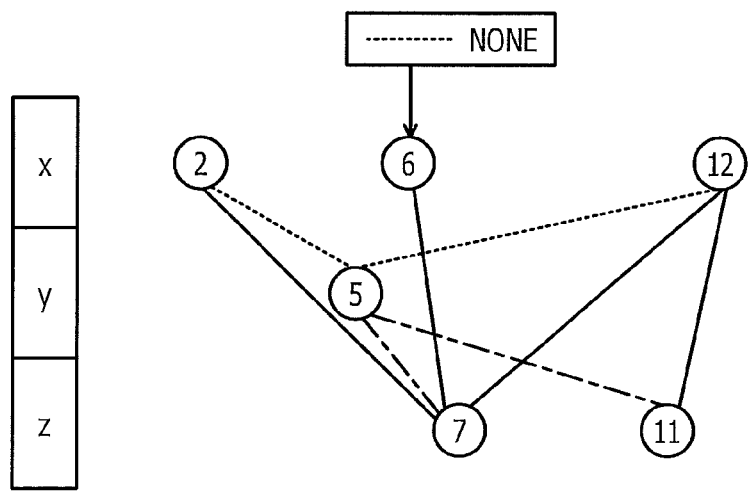
FIG. 14B
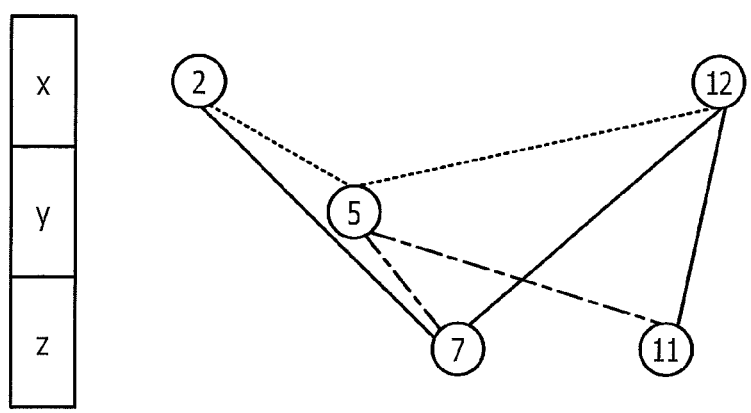
FIG. 14C
| | | | | |
|---|---|---|---|---|
| x | 2 | 2 | 12 | 12 |
| y | 5 | 5 | 5 | 5 |
| z | 7 | 11 | 7 | 11 |

FIG. 15

```
<RETRIEVAL CONDITIONS>
(1) TYPE OF X IS CPU
(2) TYPE OF Y IS MEM
(3) TYPE OF Z IS HDD
(4) VENDOR OF Y IS OTHER THAN STORE C
(5) DIFFERENCE IN PRICE BETWEEN X AND Z IS 10,000 YEN OR LESS
(6-1) VENDORS OF X AND Y ARE THE SAME
(6-2) VENDORS OF Y AND Z ARE THE SAME
(7) TOTAL SUM OF PRICE OF X, Y AND Z IS 80,000 YEN
```

(5) IS NOT SATISFIED (7) IS NOT SATISFIED (7) IS NOT SATISFIED

| x | 2 | 2 | 12 | 12 |
| y | 5 | 5 | 5 | 5 |
| z | 7 | 11 | 7 | 11 |

OUTPUT AS A RESULT OF RETRIEVAL
(x,y,z)=(12,5,7)

DATA OUTPUT METHOD, COMPUTER-READABLE RECORDING MEDIUM STORING DATA OUTPUT PROGRAM AND DATA OUTPUT SYSTEM

CROSS-REFERENCE TO RELATED APPLICATION

This application is based upon and claims the benefit of priority from the prior Japanese Patent Application No. 2013-147959 filed on Jul. 16, 2013, the entire contents of which are incorporated herein by reference.

FIELD

Exemplary embodiments of the present disclosure relate to a data output method, a computer-readable recording medium storing a data output program and a data output system.

BACKGROUND

When a data combination satisfying a predetermined condition is retrieved from a set of data, all of a plurality of data combinations are created and the data combination satisfying the predetermined condition is found from the plurality of created data combinations and is output.

When the number of data included in the set of data is large, the total number of data combinations increases, which requires much time for processing.

A related technique is disclosed in, for example, Japanese Patent Laid-Open Publication No. 2009-208904.

SUMMARY

According to one aspect of the embodiments, a data output method, includes: extracting, by a computer, data satisfying a first condition on one data among a plurality of conditions, from a plurality of data, as a node; creating a first graph by coupling two nodes satisfying a second condition on a relationship between two data among the plurality of conditions with a link; creating a second graph by deleting a node that does not satisfy the second condition from the first graph; determining candidates of data combination in the second graph; and outputting a data combination satisfying the plurality of conditions from the candidates of data combination.

The object and advantages of the disclosure will be realized and attained by means of the elements and combinations particularly pointed out in the claims. It is to be understood that both the foregoing general descriptions and the following detailed descriptions are exemplary and explanatory, and are not restrictive of the invention, as claimed.

BRIEF DESCRIPTION OF DRAWINGS

FIG. 4 illustrates an exemplary process performed by a processing server.
FIG. 5A and FIG. 5B illustrate one example of retrieval conditions.
FIG. 6A illustrates one example of Operation S14.
FIG. 6B illustrates one example of Operation S18.
FIG. 7 illustrates one example of data.
FIG. 9A and FIG. 9B illustrate one example of Operation S24.
FIG. 10 illustrates one example of a data format of a graph.
FIG. 14A, FIG. 14B and FIG. 14C illustrate one example of Operations S26 and S28.
FIG. 15 illustrates one example of Operation S32.

DESCRIPTION OF EMBODIMENTS

Figure 1:
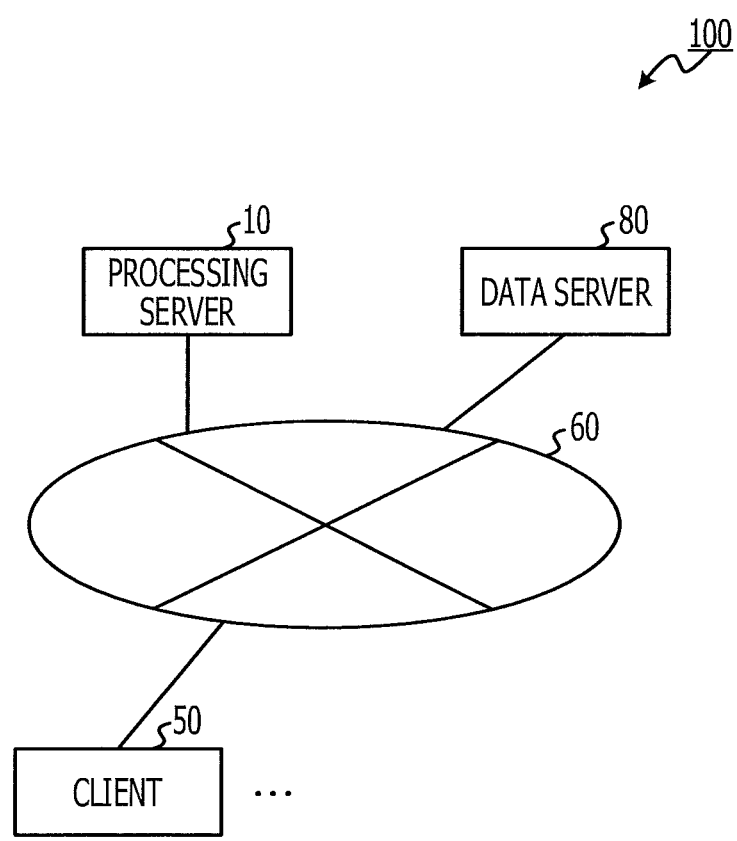
FIG. 1 illustrates one example of a data retrieval system.

FIG. 1 illustrates one example of a data retrieval system. As illustrated in FIG. 1, the data retrieval system 100 includes a processing server 10, a client 50 and a data server 80. The processing server 10, the client 50 and the data server 80 are coupled to a network 60 such as the Internet, or the Local Area Network (LAN). In the data retrieval system 100, the processing server 10 retrieves a combination of data that matches a retrieval condition from data in the data server 80, based on the retrieval condition of data input from the client 50, for example, conditions on the combination of data, and outputs the retrieved combination of data to the client 50. The data retrieval system 100 may be used, for example, to find an abnormality of a database, retrieve personal connections, or perform a batch processing including a join.

Figure 2A:
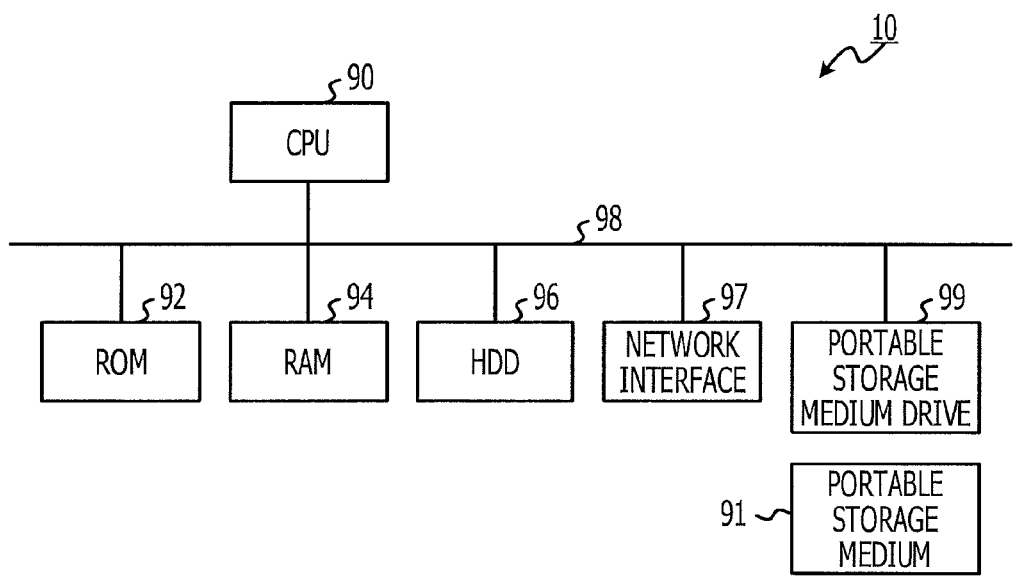
FIG. 2A illustrates one example of a hardware configuration of a processing server.
Figure 2B:
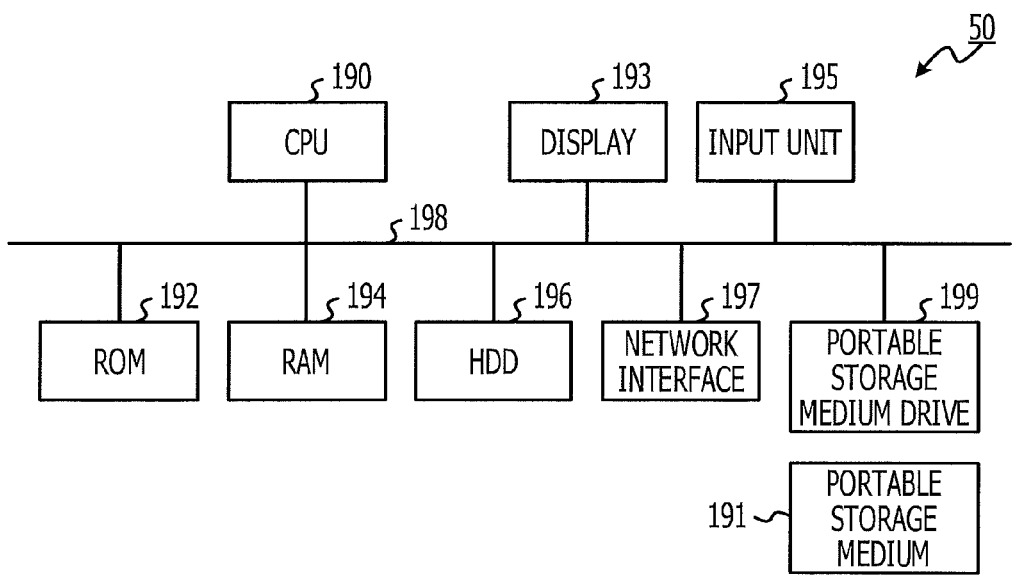
FIG. 2B illustrates one example of a hardware configuration of a client.
Figure 3:
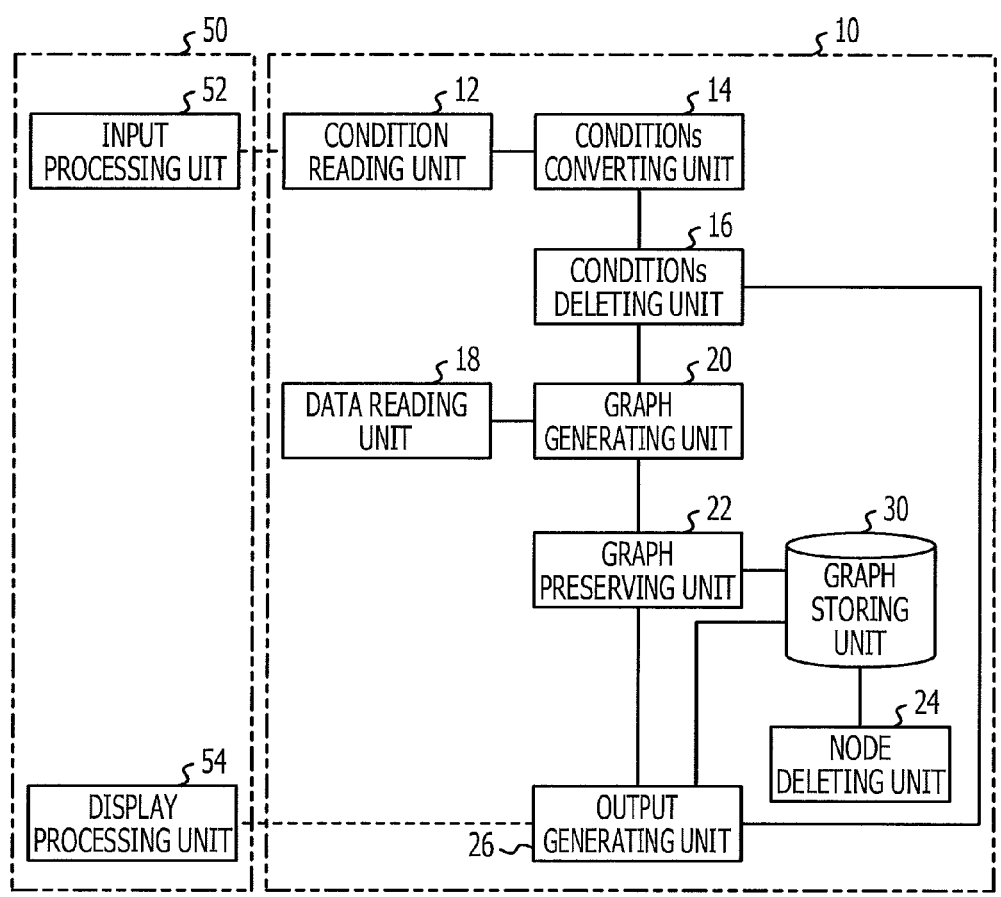
FIG. 3 illustrates one example of functional blocks of a processing server and a client.

FIG. 2A illustrates one example of a hardware configuration of a processing server. FIG. 2B illustrates one example of a hardware configuration of a client. A processing server 10 illustrated in FIG. 2A may be the processing server 10 illustrated in FIG. 1. FIG. 3 illustrates one example of functional blocks of a processing server and a client. The processing server 10 illustrated in FIG. 2A includes a CPU 90, a ROM 92, a RAM 94, a storage unit such as a HDD (Hard Disk Drive) 96, a network interface 97, and a portable storage medium drive 99. These components of the processing server 10 are coupled to a bus 98. In the processing server 10, the CPU 90 may execute programs stored in the ROM 92 or the HDD 96 (data output programs) or programs read by the portable storage medium drive 99 from a portable storage medium 91 (data output programs) so as to implement functions of various components illustrated in FIG. 3.

A client 50 illustrated in FIG. 2B may be the client 50 illustrated in FIG. 1. The client 50 illustrated in FIG. 2B includes, for example, a CPU 190, a ROM 192, a RAM 194, a storage unit (HDD) 196, a network interface 197, a portable storage medium drive 199, a display 193, and an input unit 195. These components of the client 50 are coupled to a bus 198. The display 193 may be a liquid crystal display and the input unit 195 may include, for example, a keyboard or a mouse. In the client 50, the CPU 190 may execute programs stored in the ROM 192 or the HDD 196 or programs read by the portable storage medium drive 199 from a portable storage medium so as to implement functions of various components illustrated in FIG. 3.

A client 50 illustrated in FIG. 3 may be the client 50 illustrated in FIG. 1 or FIG. 2A and a processing server 10 illustrated in FIG. 3 may be the processing server illustrated in FIG. 1 or FIG. 2B.

The client 50 illustrated in FIG. 3 includes an input processing unit 52 and a display processing unit 54. The input processing unit 52 transmits information, which is input from the input unit 195 by, for example, a user of the client 50, to the processing server 10. The display processing unit 54 displays the information on the display 193 based on an instruction from the processing server 10.

The processing server 10 illustrated in FIG. 3 includes a condition reading unit 12, a condition converting unit 14, a condition deleting unit 16, a data reading unit 18, a graph generating unit 20, a graph preserving unit 22, a node deleting unit 24 and an output generating unit 26. A graph storing unit 30 provided, for example, in the HDD 96 as illustrated in FIG. 3.

The condition reading unit 12 reads retrieval conditions of data input from the client 50, for example, the input processing unit 52, and inputs the read retrieval conditions to the condition converting unit 14. The condition converting unit 14 converts conditions, which can be converted to unary conditions, for example, conditions on one data or binary conditions, for example, conditions on a relationship between two data, among ternary or more conditions, for example, conditions on a relationship three or more data input from the condition reading unit 12, to the unary conditions or the binary conditions.

If the conditions converted by the condition converting unit 14 include redundant conditions such as transitive conditions and/or duplicate conditions, the condition deleting unit 16 deletes such redundant conditions. The condition deleting unit 16 inputs all retrieval conditions left after the deletion to the graph generating unit 20 and the output generating unit 26.

The data reading unit 18 reads a set of data to be retrieved such as a set of events or records, from the data server 80 and inputs the read set of data to the graph generating unit 20. The graph generating unit 20 uses the set of data input from the data reading unit 18 and the retrieval conditions input from the condition deleting unit 16 to generate a graph with nodes and links based on a graph theory. The graph generating unit 20 inputs the generated graph to the graph preserving unit 22.

The graph preserving unit 22 stores the graph input from the graph generating unit 20 in the graph storing unit 30. The node deleting unit 24 verifies the graph stored in the graph storing unit 30 and deletes unnecessary nodes from the graph.

The output generating unit 26 reads the graph processed by the node deleting unit 24 from the graph storing unit 30 and determines combination candidates of data satisfying the retrieval conditions from the read graph. The output generating unit 26 compares the combination candidates and the retrieval conditions, and outputs a combination of data satisfying the retrieval conditions to the client 50 (the display processing unit 54).

The data server 80 illustrated in FIG. 1 stores various types of data. FIG. 7 illustrates one example of data. The data illustrated in FIG. 7 may be data read by the data reading unit. For example, a database illustrated in FIG. 7 may be stored. The database illustrated in FIG. 7 may be a database in which suppliers and prices of parts such as HDDs, CPUs, and MEMs (memories) are stored, or may include fields for "ID", "Type", "Vendor", and "Price", for example. A serial number of data is stored in the "ID" field and a part name is stored in the "Type" field. A name of vendor selling parts is stored in the "Vendor" field and a part price in the vendor is stored in the "Price" field.

FIG. 4 illustrates an exemplary process performed by a processing server. FIGS. 5A and 5B illustrate one example of retrieval conditions. The processing illustrated in FIG. 4 may be performed at in a stage where the retrieval conditions are input from the client 50 (the input processing unit 52).

At Operation S10, the condition reading unit 12 of the processing server 10 reads the retrieval conditions input from the client 50 (the input processing unit 52). For example, the condition reading unit 12 may read the retrieval conditions illustrated in FIG. 5A. The processing server 10 retrieves a combination of data of x, y and z satisfying the retrieval conditions illustrated in FIG. 5A and outputs the retrieved data combination to the client 50 (the display processing unit 54). Examples of the retrieval conditions of FIG. 5A may include unary conditions (1) to (4) (conditions on one data), binary conditions (5) (conditions on a relationship between two data) and ternary conditions (6) and (7) (conditions on a relationship between three data), as illustrated in FIG. 5B.

At Operation S12, the condition converting unit 14 determines whether conditions, which can be converted to a plurality of binary conditions or unary conditions among the ternary or more conditions, are included in the retrieval conditions. Ternary or more conditions which can be converted to a plurality of binary conditions or unary conditions means conditions such as equivalence or magnitude relationship between three data. In the retrieval conditions of FIG. 5A, "(6) Vendors of x, y and z are the same" may correspond to the ternary or more conditions which can be converted to plurality of binary conditions.

If the determination result at Operation S12 is affirmative, the process proceeds to Operation S14. Otherwise, the process proceeds to Operation S20.

At Operation S14, the condition converting unit 14 converts ternary or more conditions, which can be converted to a plurality of binary conditions or unary conditions, to the binary conditions or the unary conditions. FIG. 6A illustrates one example of Operation S14. For example, as illustrated in FIG. 6A, the condition of "(6) Vendors of x, y and z are the same" is converted to the condition of "Vendors of x and y are the same", the condition of "Vendors of y and z are the same" and the condition of "Vendors of z and x are the same".

At Operation S16, the condition deleting unit 16 determines whether or not redundant conditions are included in the converted conditions. For example, if two of the conditions of "Vendors of x and y are the same", the condition of "Vendors of y and z are the same" and the condition of "Vendors of z and x are the same" are met, the remaining other condition is also met. Accordingly, one of the three conditions may be duplicate conditions (redundant conditions). For example, if the determination result at Operation S16 is affirmative, the process proceeds to Operation S18. If the determination in S16 is negative, the process proceeds to Operation S20. For example, an example of the redundant conditions may include transitive conditions in addition to the duplicate conditions.

When the process proceeds to Operation S18, the condition deleting unit 16 deletes the redundant conditions. FIG. 6B illustrates one example of Operation S18. For example, as illustrated in FIG. 6B, the condition deleting unit 16 may delete the conditions of "Vendors of z and x are the same".

After Operation S18, the process proceeds to Operation S20. The condition deleting unit 16 may delete the conditions of "Vendors of x and y are the same" or the condition of "Vendors of y and z are the same" instead of the condition of "Vendors of z and x are the same".

After Operation S18 or if the determination result at Operation S12 or S16 is negative, the process proceeds to Operation S20 where the data reading unit 18 reads data. For example, the data reading unit 18 may read data of the database of FIG. 7 from the data server 80.

Figures 8A, 8B:
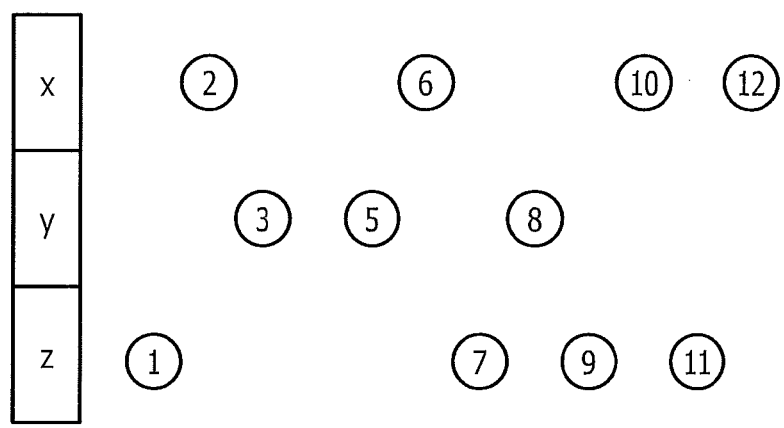
FIG. 8A and FIG. 8B illustrate one example of Operation S22.

FIG. 8A and FIG. 8B illustrate one example of Operation S22. At Operation S22, the graph generating unit 20 extracts data satisfying the unary conditions and sets the extracted data as a node. For example, data (candidates of x, y and z) satisfying unary conditions illustrated in bold in FIG. 8A, i.e., conditions of "(1) Type of x is CPU", "(2) Type of y is MEM", "(3) Type of z is HDD" or "(4) Vendor of y is other than store C" is extracted from the database of FIG. 7 and are set as a node. As illustrated in FIG. 8B, data IDs of 2, 6, 10 and 12, data IDs of 3, 5 and 8, and data IDs of 1, 7, 9 and 11 are respectively extracted as candidates of x, candidates of y, and candidates of z and are set as nodes.

FIG. 9A and FIG. 9B illustrate one example of Operation S24. At Operation S24, the graph generating unit 20 creates a side, for example, a link, between nodes satisfying binary conditions. For example, the graph generating unit 20 couples nodes satisfying binary conditions illustrated in bold in FIG. 9A, i.e., conditions of "(5) Difference in price between x and y is 10,000 Yen or less", "(6-1) Vendors of x and y are the same" and "(6-2) Vendors of y and z are the same", with sides. FIG. 9B illustrates a state (graph) where nodes are coupled with sides. In FIG. 9B, sides based on the condition (5) are indicated by solid lines, sides based on the condition (6-1) are indicated by dashed lines, and sides based on the condition (6-2) are indicated by alternate long and short dash lines.

At the step where the graph illustrated in FIG. 9B is created, the graph preserving unit 22 stores the graph in the graph storing unit 30. FIG. 10 illustrates one example of a data format of a graph. The data format illustrated in FIG. 10 may be stored in the graph storing unit. For example, the graph preserving unit 22 may preserve the graph of FIG. 9B as a data structure illustrated in FIG. 10. For example, if a node is deleted in the process of deleting the node from the graph, the data structure may be a data structure through which information of an associated side and information of a node coupled to the node to be deleted with a side are efficiently accessible. For example, as illustrated in FIG. 10, data of nodes are assigned with addresses, 0x1, 0x2, . . . . Data of each node may have items of element ID, data ID, list solid line, list dashed line and list alternate long and short dash line. One of x, y and z may be stored in the element ID, and an ID of data itself may be stored in the data ID. Addresses of nodes coupled with sides may be stored in the list solid line, the list dashed line and the list alternate long and short dash line.

Figure 11A:
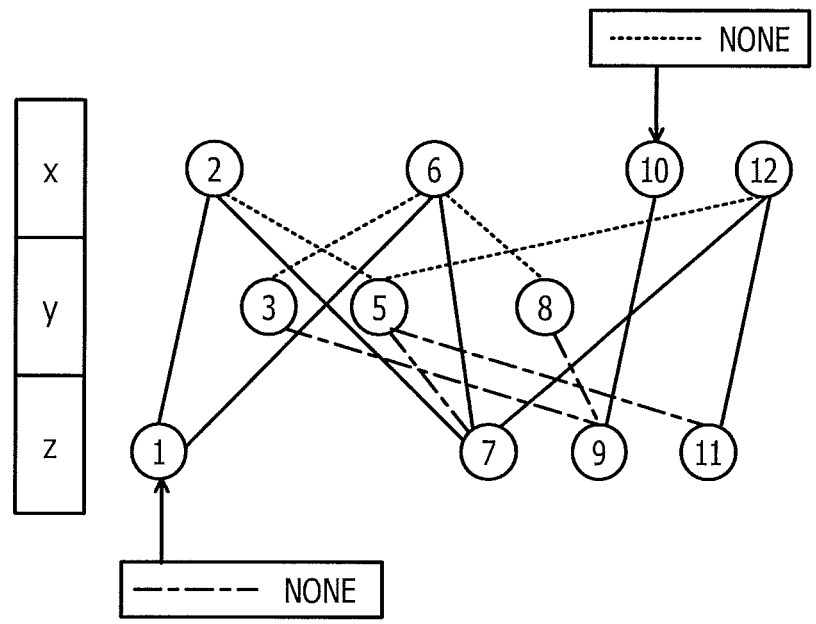
FIG. 11A and FIG. 11B illustrate one example of Operations S26 and S28.
Figure 11B:
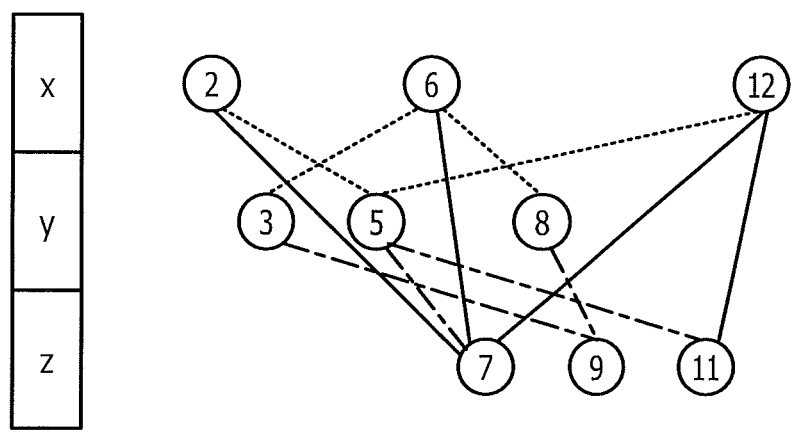
Figure 12A:
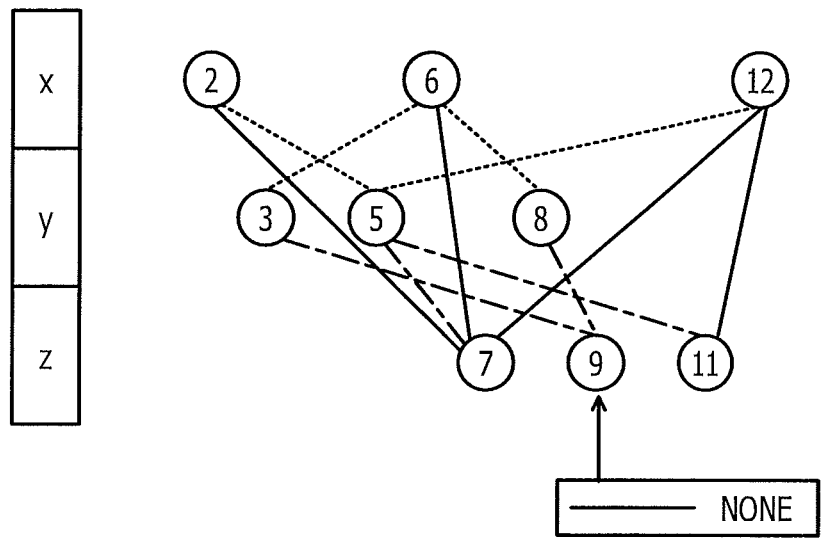
FIG. 12A and FIG. 12B illustrate one example of Operations S26 and S28.
Figure 12B:
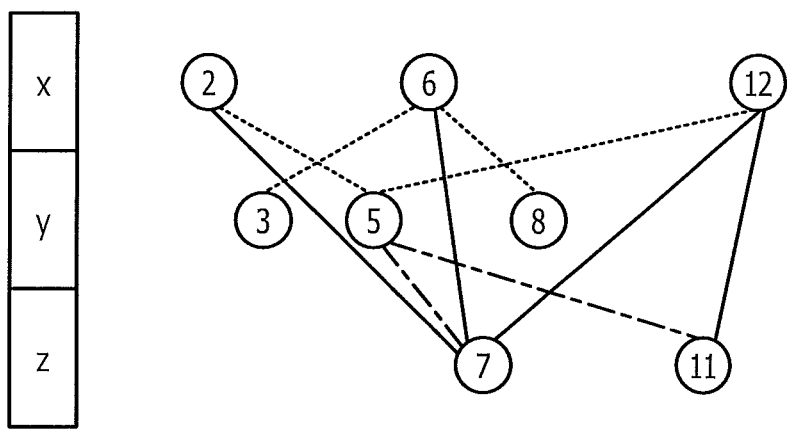
Figure 13A:
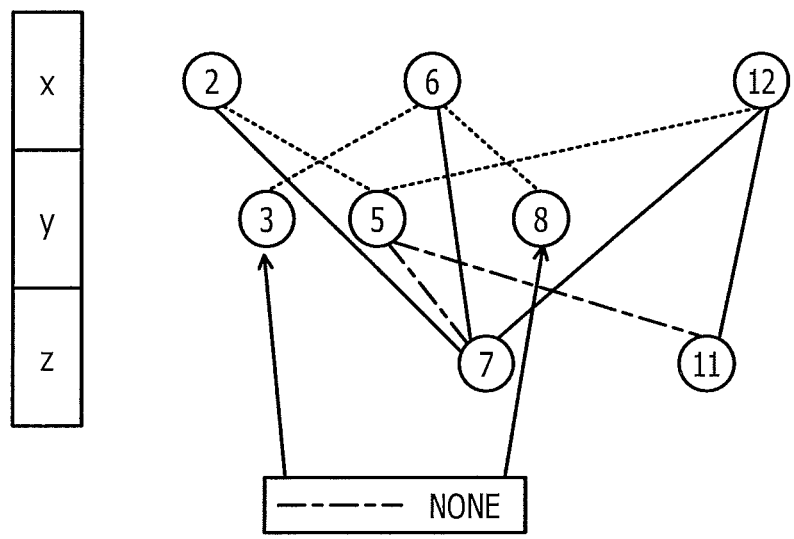
FIG. 13A and FIG. 13B illustrate one example of Operations S26 and S28.
Figure 13B:
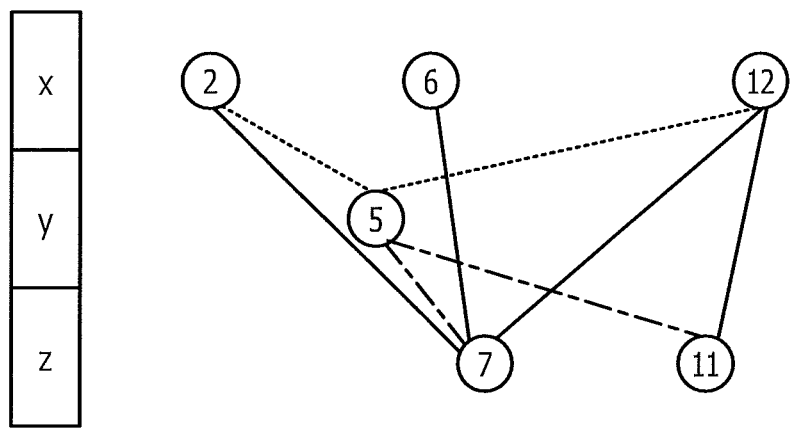

At Operation S26 illustrated in FIG. 4, the node deleting unit 24 determines whether or not there is a node which does not satisfy the binary conditions. FIG. 11A and FIG. 11B illustrate one example of Operations S26 and S28. FIGS. 12A and 12B illustrate one example of Operation S26 and S28. FIG. 13A and FIG. 13B illustrate one example of Operations S26 and S28. FIG. 14A and FIG. 14B illustrate one example of Operations S26 and S28. For example, in FIG. 10, it is determined whether or not there is a node where an address is not stored in its own list although an address is stored in a list of a different node of the same element ID. If the determination is affirmative, the process proceeds to Operation S28 where the node deleting unit 24 deletes a node which does not satisfy the conditions, and then the process returns to Operation S26. The node deleting unit 24 may repeat Operation S26 until the nodes which do not satisfy all the binary conditions disappear, for example, until no node to be deleted exists.

For example, in FIG. 10, although an address is stored in the item "List dashed line" of each of the nodes having addresses 0x1, 0x2 and 0x4 of the element ID=x, no address is stored in the item "List dashed line" of a node (data ID=10) having address 0x3. For example, in FIG. 10, although an address is stored in the item "List alternate long and short dash line" of each of the nodes having addresses 0x9, 0x10 and 0x11 of the element ID=z, no address is stored in the item "list alternate long and short dash line" of a node (data ID=1) having address 0x8. For example, as illustrated in FIG. 11A, since a side of a dashed line is not coupled to the node (data ID=10) and a side of an alternate long and short dash line is not coupled to the node (data ID=1), the node deleting unit 24 deletes, for example, the node having data ID=10 and the node having data ID=1 (see, e.g., FIG. 11B). For example, the node deleting unit 24 accesses the graph storing unit 30 to delete data of a node to be deleted, among data of FIG. 10, and deletes an address of the deleted node from each item of "List solid line", "List dashed line" or "List long and short dash line of data" of a different node.

As illustrated in FIG. 11B, there may appear a new node which does not satisfy the binary conditions in the graph in which the nodes (data ID=10 and 1) have been deleted. In FIG. 12A, a side of a solid line is not connected to a node (data ID=9). Accordingly, the node deleting unit 24 may delete the node (data ID=9), as illustrated in FIG. 12B.

In the graph in which the node (data ID=9) has been deleted, a side of an alternate long and short dash line is not coupled to nodes (data ID=3 and 8), as illustrated in FIG. 13A. Accordingly, the node deleting unit 24 may delete the nodes (data ID=3 and 8), as illustrated in FIG. 13B.

In the graph in which the nodes (data ID=3 and 8) have been deleted, a side of a dashed line is not coupled to a node (data ID=6), as illustrated in FIG. 14A. Accordingly, the node deleting unit 24 may delete the node (data ID=6), as illustrated in FIG. 14B.

For example, in the stage where the graph stored in the graph storing unit 30 is created as illustrated in FIG. 14B, since any nodes to be deleted disappear, the determination result at Operation S26 in FIG. 4 is negative and the process proceeds to Operation S30.

When the process proceeds to Operation S30, the output generating unit 26 enumerates (determines) candidates of data combination based on the graph stored in the graph storing unit 30, for example, the graph in which all the nodes to be deleted have been deleted. For example, all combinations of nodes (data) left in the graph illustrated in FIG. 14B (see FIG. 14C) may be enumerated as combination candidates.

At Operation S32, the output generating unit 26 outputs combinations satisfying the retrieval conditions among the enumerated combination candidates to the client 50, for example, the display processing unit 54. For example, the output generating unit 26 determines whether or not each combination satisfies all conditions (1) to (7), for example, binary and ternary conditions (5) to (7). FIG. 15 illustrates one example of Operation S32. In FIG. 15, (x, y, z)=(2, 5, 7) does not satisfy the conditions (7), (x, y, z)=(2, 5, 11) does not satisfy the condition (5), and (x, y, z)=(12, 5, 11) does not satisfy the condition (7). Accordingly, the output generating unit 26 outputs a combination (x, y, z)=(12, 5, 7) satisfying all conditions to the display processing unit 54. Upon receiving the data combination from the output generating unit 26, the display processing unit 54 displays (x, y, z)=(12, 5, 7) as a result of retrieval on the display 193 of the client 50.

For example, all combinations of nodes included in the graph of FIG. 14B may be set as combination candidates satisfying the conditions. For example, in FIG. 14B, since nodes of data ID=2 and data ID=11 are not coupled with a side of a solid line, a combination (2, 5, 11) including the nodes of data ID=2 and data ID=11 may be excluded from the candidates. The output generating unit 26 may output a combination satisfying the condition (7) among the combination candidates, which may result in simplified process.

The graph generating unit 20 extracts data satisfying the unary conditions as a node and creates a graph by coupling nodes satisfying the binary conditions with sides (links) (S22 and S24). The node deleting unit 24 repeats the process (S28) of deleting nodes, which do not satisfy the binary conditions to be satisfied by the nodes, from the graph until there exist no nodes to be deleted (until the determination result at Operation S26 is negative). The output generating unit 26 enumerates (S30) candidates of data combination based on the graph in which the nodes have been deleted by the node deleting unit 24 and outputs data combinations satisfying the conditions based on the enumerated candidates and the input conditions. The process of deleting the nodes of the graph is repeated and thus, the candidates of data combination are narrowed. Since the output generating unit 26 retrieves a combination satisfying the conditions among the narrowed combinations, a data combination satisfying the conditions may be found in a short time, as compared with retrieval of a data combination satisfying the conditions among all of data combinations.

If ternary conditions are included in the retrieval conditions, the condition converting unit 14 converts the ternary conditions to unary conditions or binary conditions (S14). Accordingly, even the ternary conditions may be used to narrow candidates of data combination using a graph, which may result in an improved accuracy of narrowing the candidates of data combination.

If redundant conditions are included in the converted conditions after Operation S14, the condition deleting unit 16 deletes the redundant conditions (S18), which may result in reduction of unnecessary processes in the graph generating unit 20 or the node deleting unit 24.

At Operation S14, the condition converting unit 14 may convert the ternary conditions. For example, if quaternary conditions or quinary conditions are equivalent conditions, these conditions may be converted into unary conditions or binary conditions. For example, if redundant conditions are included in the converted conditions, the condition deleting unit 16 may delete the redundant conditions, which may result in reduction of unnecessary processes to simplify the process.

The above-described processes may be executed by a computer. A program describing the contents of functions of a processor may be provided. The program may be executed by the computer so as to implement the processor functions on the computer. The program describing the processing contents may be recorded on a computer-readable recording medium other than a carrier wave.

The program may be distributed in the form of a portable recording medium such as a Digital Versatile Disc (DVD) or Compact Disc Read Only Memory (CD-ROM), in which the program is recorded. The program may be stored in a storage device of a server computer and transmitted from the server computer to another computer via, for example, a network.

A computer executing the program stores the program recorded on the portable recording medium or the programs transmitted from the server computer in its own storage device. The computer may read the program from its own storage device and execute processes according to the programs. The computer may execute the programs directly read from the portable recording medium. The computer may execute processes according to the programs received each time the program is transmitted from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the exemplary embodiments of the present invention have been described in detail, it should be understood that the various changes, substitutions, and alterations could be made hereto without departing from the spirit and scope of the invention.

What is claimed is:

1. A data output method, comprising:
  extracting, by a computer, a plurality of second data satisfying respective first conditions on one data among a plurality of conditions, from a plurality of first data, as nodes;
  extracting, from the nodes, combinations of two nodes satisfying respective second conditions on a relationship between two data among the plurality of conditions;
  creating a first graph by coupling the two nodes of each of the combinations;
  detecting, from a group of nodes which are included in the nodes and satisfy the same first condition of the first conditions, one or more nodes which do not satisfy one of the second conditions which at least one node of the group satisfies;
  creating a second graph by deleting the one or more nodes;
  determining candidates of data combination in the second graph; and
  outputting a data combination satisfying the plurality of conditions from the candidates of data combination,
  wherein a process of deleting a node is repeated until a node which does not satisfy one of the second conditions disappears from the first graph.

2. The data output method of claim 1, further comprising:
  converting, when a third condition on a relationship between three or more data is included in the plurality of conditions, the third condition, a converted first condition on one data or a converted second condition on the relationship between two data.

3. The data output method of claim 2, further comprising:
  deleting, when redundant conditions are included in the converted first condition or the converted second condition, the redundant conditions.

4. A non-transitory computer-readable recording medium storing a data output program for causing a computer to execute operations of:
  extracting a plurality of second data satisfying respective first conditions on one data among a plurality of conditions, from a plurality of first data, as nodes;

extracting, from the nodes, combinations of two nodes satisfying respective second conditions on a relationship between two data among the plurality of conditions;

creating a first graph by coupling the two nodes of each of the combinations;

detecting, from a group of nodes which are included in the nodes and satisfy the same first condition of the first conditions, one or more nodes which do not satisfy one of the second conditions which at least one node of the group satisfies;

creating a second graph by deleting the one or more nodes;

determining candidates of data combination in the second graph; and outputting a data combination satisfying the plurality of conditions from the candidates of data combination, wherein a process of deleting a node is repeated until a node which does not satisfy one of the second conditions disappears from the first graph.

5. The non-transitory computer-readable recording medium of claim 4, further comprising:

converting, when a third condition on a relationship between three or more data is included in the plurality of conditions, the third condition, a converted first condition on one data or a converted second condition on the relationship between two data.

6. The non-transitory computer-readable recording medium of claim 5, further comprising:

deleting, when redundant conditions are included in the converted first condition or the converted second condition, the redundant conditions.

7. A data output system, comprising:

a memory configured to store a data output program:

a computer processing unit configured to execute a program to perform operations of:

extracting a plurality of second data satisfying respective first conditions on one data among a plurality of conditions, from a plurality of first data, as nodes;

extracting, from the nodes, combinations of two nodes satisfying respective second conditions on a relationship between two data among the plurality of conditions;

creating a first graph by coupling the two nodes of each of the combinations;

detecting, from a group of nodes which are included in the nodes and satisfy the same first condition of the first conditions, one or more nodes which do not satisfy one of the second conditions which at least one node of the group satisfies;

creating a second graph by deleting the one or more nodes;

determining candidates of data combination in the second graph; and outputting a data combination satisfying the plurality of conditions from the candidates of data combination, wherein a process of deleting a node is repeated until a node which does not satisfy one of the second conditions disappears from the first graph.

8. The data output system of claim 7, wherein the operations includes:

converting, when a third condition on a relationship between three or more data is included in the plurality of conditions, the third condition, a converted first condition on one data or a converted second condition on the relationship between two data.

9. The data output system of claim 8, wherein the operations includes:

deleting, when redundant conditions are included in the converted first condition or the converted second condition, the redundant conditions.

* * * * *